Oct. 20, 1953　　　N. J. McDONALD　　　2,655,873
RAILWAY MOTOR VEHICLE
Filed April 5, 1951　　　2 Sheets-Sheet 1
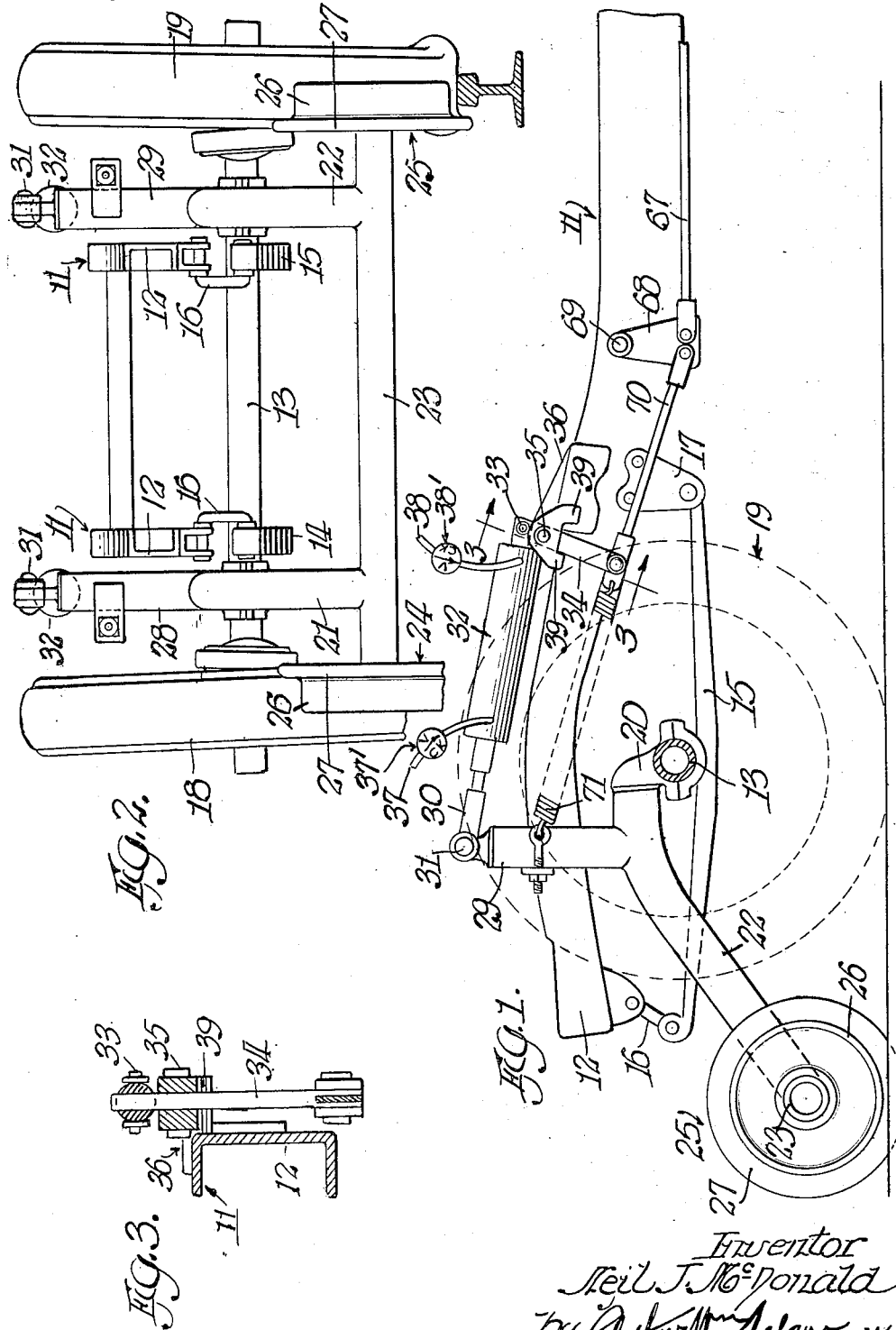
Inventor
Neil J. McDonald

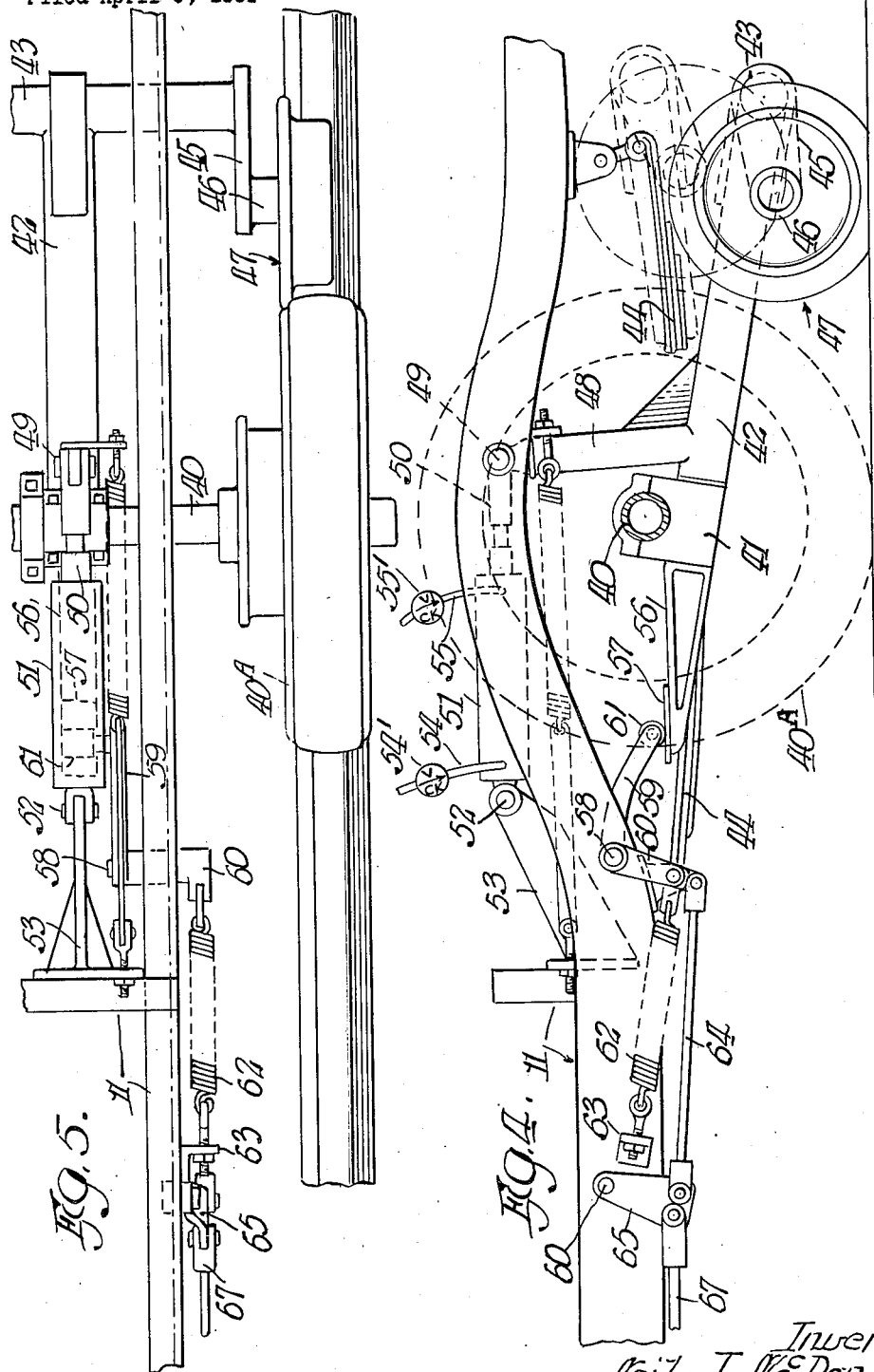

Patented Oct. 20, 1953

2,655,873

UNITED STATES PATENT OFFICE 2,655,873

RAILWAY MOTOR VEHICLE

Neil J. McDonald, Fairmont, Minn., assignor to Fairmont Railway Motors, Inc., Fairmont, Minn., a corporation of Minnesota Application April 5, 1951, Serial No. 219,460

17 Claims. (Cl. 105—215)

1

The invention relates to improvements in railway motor vehicles and more particularly to structures for adapting a motorized vehicle so that it may travel either on the highways or upon railroad tracks.

These improvements are applied to motorized vehicles having flangeless wheels, for example, vehicles having pneumatic tires thereon designed for travel upon highways, and which, when traveling on the rails of a railroad track, ride directly on the rails. Such a vehicle must, therefore, rely upon flanged guide wheels or some other guide mechanism for preventing the flangeless vehicle wheels from running off the rails.

Vehicles of this general character have, heretofore, been manufactured and used. In connection with their use it has been found advisable to provide a pair of retractable flanged guide or pilot wheels mounted in front of the front vehicle wheels, and another pair of retractable flanged guide or pilot wheels mounted behind the rear vehicle wheels.

Through experience it has also been discovered that when an automotive vehicle so equipped is loaded during work operations, the loading usually is concentrated over the rear springs of the vehicle causing the rear end to tip downwardly and the front end to be tilted upwardly. In the absence of precautions especially adapted for preventing this such upward tilting of the front end of the vehicle would, in some cases, lift the front pilot wheels so high as to raise their flanges above the rail surfaces and therefore render the front pilot or guide wheels incapable of performing their intended functions. This is especially true where the treads of the front pilot wheels are not maintained in direct engagement with the rail surface by some spring loaded mechanism which could normally press them against the rail heads despite the tilting of the vehicle.

In the preferred embodiment of my invention the pilot wheels, both rear and forward, are maintained at a slight elevation or clearance above the rail heads, during normal operations when the vehicle is traveling on the railroad tracks. By maintaining this clearance none of the weight of the vehicle is carried normally by the pilot wheels. Consequently, when the vehicle is being accelerated by motive power or decelerated by braking the entire weight of the vehicle is imposed on the vehicle wheels, thus contributing to the maximum tractive and braking effectiveness of the pneumatic wheels, which

2 in many cases can be of extreme and grave importance.

Also by maintaining some clearance between the pilot wheels and the rail heads, track noises are diminished substantially.

In the preferred embodiment the guide wheels, when lowered to the track clearance position, are held there substantially rigidly so that the vehicle weight will resist any tendency of the guide wheels to climb on track turns and also this rigid support of the guide wheels enables them to instantly and safely sustain a portion of the vehicle weight should there be a tire failure.

While retaining all of the advantages inherent in such guide wheel clearance, this invention provides in combination with the guide wheel supporting mechanism a compensating mechanism for maintaining the front guide wheels at the proper safe clearance even though the rear end of the vehicle may be variably lowered by loads of various weights.

The general object of the invention, therefore, is to provide front and rear guide wheel mechanisms for such a dual purpose track and highway vehicle, together with means for maintaining a desired operative position of the front guide wheels responsive to tilting of the vehicle frame under variable load conditions.

Other objects and advantages of the invention which are inherently possessed thereby will be mentioned hereinafter or will become apparent from a reading of the following specification, in which a preferred embodiment of the invention is described.

Referring now to the drawing,

Fig. 1 is a side elevation showing the front end portion of a combined highway and rail vehicle equipped in accordance with this invention.

Fig. 2 is a front elevation of the same vehicle.

Fig. 3 is a sectional view on the line 3—3 of Fig. 1.

Fig. 4 is a side elevation of the rear end portion of the vehicle equipped in accordance with this invention.

Fig. 5 is a top plan view of the parts shown in Fig. 4.

Referring further to the drawings, it may be assumed that the vehicle which serves the dual purpose of traveling on rails or upon a highway will be an automotive vehicle, preferably having the usual rigid longitudinal frame, to which is attached the motor and body, front and rear transverse axles or axle housings carrying typical flangeless road wheels, for example, pneumatic tired wheels, with springs supporting the rigid frame upon said axles or axle housings. With respect to this invention it is immaterial whether such frame be formed independently of or integrally with the vehicle body. One common form of spring suspension employed today in such vehicles comprises semi-elliptical springs, the central portions of which are connected to the front and rear axles or housings by well-known spring shackles to the frames. Such an assembly of frame, axles and springs is shown in the accompanying drawings.

In the drawings the guide wheel mounting mechanism and the compensating mechanism are shown, for the sake of simplicity, primarily on just one side of the vehicle, although preferably the mounting and compensating structures are duplicated on both longitudinal sides of the vehicle.

Accordingly, in Fig. 1 there is shown a longitudinal frame member 11 having a forward portion 12, which in accordance with usual practice, is arched upwardly to provide an adequate clearance above the front axle. The front axle 13, shown in Fig. 2, is connected by clamps (not shown) with typical semi-elliptical springs 14 and 15, these springs being connected by conventional spring shackles such as 16 and 17 to the vehicle frame. The front vehicle wheels 18 and 19 are connected with the front axle in a manner which is common to automotive vehicle construction, permitting the wheels to rotate and also to be steered by means of a typical steering wheel and gear apparatus, these details of construction not forming a part of this invention and therefore not being shown. However, it may be said here that when a vehicle, equipped in accordance with this invention, is run onto the railroad track and the guide wheels are lowered to their operative position such a steering mechanism would preferably be locked by any appropriate means, not a part of this invention, so that the guide wheels alone serve to maintain the vehicle on the track and steer it around the curves and through switches.

While Fig. 2 shows as a front axle a tubular member 13 to which the guide wheels are pivotally connected, it should be stated also that in the event that the vehicle employed is a four wheel drive automotive vehicle, in place of a plain tubular member 13 there will be an axle housing and a differential gear housing, the axle housing then serving as the member to which the guide wheel assembly is pivotally connected.

The front guide wheel mounting assembly includes a pair of brackets, one of which indicated as 20 is shown in Fig. 1, rotatably mounted on the front axle 13, and extending forwardly from each of these brackets is a rigid arm such as 21 and 22, these arms serving to carry at their forward ends a transversely extending non-rotatable shaft 23 upon which the flanged guide wheels 24 and 25 are rotatably mounted. Each of these guide wheels has a metal tread such as 26 and a metal flange 27 and, during "on the track" operations, the tread will be positioned a short distance above the rail head, for example about 3/8" above the rail head, whereas the flange 27 will extend downwardly below the top of the rail head far enough to perform the desired flanging or guiding operation.

Extending upwardly and rigidly connected to the arms 21 and 22 are the posts 28 and 29 for connection with the apparatus for lowering and retracting the guide wheels. As shown in Fig. 1 a hydraulic mechanism is used for raising and lowering the front guide wheels, and while this mechanism will be described only in connection with the post 29 and arm 22, it will be understood that this hydraulic mechanism is duplicated at the other side of the guide wheel assembly. A piston rod 30 is pivotally connected at 31 to the upper end of the post 29 and carries a piston, not shown, within the cylinder 32, the opposite end of the cylinder being pivotally connected at 33 with an arm 34 which itself is pivotally mounted at 35 on a bracket 36 secured rigidly to the vehicle frame 11.

Preferably, this hydraulic system is operated by oil maintained under pressure by a pump and reservoir system carried on the vehicle. Included in such a system would be appropriate manual controls for enabling the operator of the vehicle to actuate levers to energize the hydraulic system to quickly raise the guide wheels to an inoperative position or to lower them to an operative position where they are positioned just slightly above the rail heads. In this connection flexible pipes such as 37 and 38 supply the hydraulic fluid, for example oil under compression, selectively to the opposite ends of the cylinder to drive the piston one way or the other. The details of construction of this cylinder and the hydraulic system for supplying the oil or other fluid under pressure do not form a part of this invention—hence require no description herein, as such systems are well known and are presently in use, both in vehicles of this character and also in connection with the landing gear mechanism of commercial airplanes.

It should be stated here that as is the common practice in such retractable wheel systems and as should be provided here, when the piston is propelled to one end of the cylinder to lower the guide wheels the piston is allowed to travel its full distance to the end of the cylinder and becomes locked in that position not only by a check valve in the oil line but also by some appropriate mechanical lock such as a row of spring pressed balls which seat in a groove in the piston, such balls customarily being released from their locking function by the application of hydraulic pressure for the purpose of reversing the movement of the piston. Merely symbolically, check valves 37' and 38' are shown for such purpose. Such a mechanical locking mechanism or other suitable mechanical locking mechanism should be used in connection with this invention so that in the event the pressure on the oil supply system should fail, the guide wheels will nevertheless be held rigidly locked down in guiding position, if the failure occurs when they are in such position. Similarly, they will be locked in elevated position by a mechanical means so that they may not fall if the oil pressure fails when they are elevated and the vehicle is traveling on the highway.

Integrally formed with the bracket 36 are a pair of projections 39 and 39 which serve as stop limits for the oscillation of the lever 34 as an aid in the setting of the compensating mechanism, hereinafter to be described.

Figs. 4 and 5 show the manner of mounting the assembly which carry the rear guide wheels. Near each end of the rear axle housing 40 there is mounted a bracket such as 41 for rotation on the axle housing and each such bracket carries integrally therewith a rearwardly extending arm 42 which is rigidly connected with a non-rotatable transverse shaft 43. It will be noted that this shaft is positioned sufficiently rearwardly of the axle housing so that when the guide wheel assembly is lifted to its inoperative position this shaft will pass to the rearward of the rear end of the vehicle spring 44. Each opposite end of the shaft 43 carries a rigid forwardly extending arm 45 in which is fixed a short stub shaft 46 which rotatably carries a rear guide wheel generally indicated as 47, such guide wheel having a tread and flange identical with those shown on the front guide wheels. Thus the guide wheels when in operative position are very close to the rear vehicle wheels, 40A.

Rigidly secured to each arm such as 42 is an upwardly extending rigid post 48 at the upper end of which at 49 is pivotally connected a piston rod 50 secured to a piston (not shown), reciprocable within the cylinder 51. This cylinder is pivotally connected at 52 to a bracket 53 rigidly secured to the vehicle frame member 11. This hydraulic cylinder has flexible hose connections 54 and 55 connecting it to the foregoing mentioned hydraulic system which furnishes fluid pressure for retracting and lowering the rear guide wheels. As explained heretofore, such a hydraulic means for retracting and lowering the guide wheels should be provided preferably with check valves and with mechanical locks to hold the guide wheels positively locked either in raised or lowered position. Check valves 54' and 55' for such purpose are shown merely symbolically.

In the instance of both the front and rear guide wheels, when they are lowered to their track running positions, slightly above the rail heads, the linkage with which they are connected becomes a rigid linkage, held rigidly immovable both by the hydraulic fluid which is maintained at constant pressure therein by a check valve and also by the mechanical lock to which reference has been made. Thus should a tire on any of the four vehicle wheels deflate the adjacent guide wheel will serve immediately to support that portion of the vehicle in a position only very slightly lowered from its normal running position. Nevertheless, in track operation these guide wheels do not normally ride on the rail heads and accordingly the full weight of the vehicle is carried by the treads of the vehicle wheels. In view of the dual purpose of these vehicles, that is, for running on railroad tracks and on highways, usually the wheels are provided with pneumatic rubber tires and, as will be readily appreciated, such rubber tires might slip when in contact with wet rails, especially if part of the vehicle load were borne by the guide wheels, as has been the practice with some prior dual purpose vehicles of this general character. However, by keeping the guide wheels out of contact with the rail heads the vehicle wheel treads carry the entire vehicle load and are therefore able to provide the maximum possible frictional contact both for traction and for braking operations.

Most automotive vehicles of this class usually have an internal combustion motor mounted at the forward end, and a load carrying space is generally located more nearly over the rear axle. Consequently when the vehicle becomes heavily loaded the rear end of the vehicle frame will press downwardly with greater force upon the rear semi-elliptical springs such as 44. Such loading however will not alter the clearance of the rear guide wheels. By a proper selection of the pivot points and the links, substantially as shown, constituting the rear guide wheel assembly, this downward approach of the vehicle frame toward the rear axle does not cause the arm 42 to rotate about the axle housing. Substantially vertical rectilinear movements of the vehicle frame relatively to the rear vehicle axis within normal ranges of such movements will cause the pivot point 52 on the bracket 53 to move vertically through a relatively short path. At normal loading the pivot points 52 and 49 are at the same elevation, as shown, and a small amount of vertical movement of pivot point 52 resulting from loading of the frame will have a negligible effect upon the rotative position of pivot 49. The arm will remain in the position shown in Fig. 4 and the guide wheel clearance will remain undisturbed. However, as the rear end of the vehicle frame is pressed downwardly by the load, the forward end of the vehicle frame tilts upwardly, and unless special provision were made to prevent it, the front guide wheels would be raised above their normal clearance position and possibly far enough above it so that the flanges on the front guide wheels would no longer serve to maintain the vehicle on the railroad track. Accordingly, I have provided a compensating mechanism, which will now be described.

Referring now to Figs. 1 and 4 it will be noted that integral with the front end of the arm 42 there is another arm 56 having on its upper surface a cam plate 57. Pivotally mounted on the vehicle frame at 58 is a bell crank having arms 59 and 60, the rear arm carrying a cam roller 61 which is held in firm rolling contact with the cam plate 57 by means of the tension spring 62 anchored on the bracket 63 attached to the vehicle frame.

A rod 64 is pivotally connected to the lower end of the bell crank arm 60 and also pivotally connected with a plate 65 pivotally mounted on the vehicle frame at 66. Another rod 67 is pivotally connected to the plate 65 and to another plate 68 (Fig. 1) pivoted on the vehicle frame at 69. A third rod 70 is pivoted to the plate 68 and pivotally connected with the lower end of the lever 34. A coil spring 71 attached to the post 29 serves to minimize play and rattle in this compensating mechanism just described.

It may now be perceived that if through heavy loading of the vehicle the rear end of the vehicle frame moves downwardly toward the vehicle axle housing 40, as the bell crank pivot 58 simultaneously moves down therewith the cam roller 61 will move toward the rear and the resultant rotation of the bell crank will pull the rods 64, 67 and 70 rearwardly, which will therefore through the connection with the lever 34 cause the front guide wheel assembly to be rotated downwardly to maintain the guide wheels at the proper clearance level above the rail head. Thus all four guide wheels will remain at the proper clearance despite variations in the loading of the vehicle.

In the use of the invention, the flanges of these guide wheels will serve to keep the vehicle wheels riding on the rail heads and to guide the vehicle around curves and through switches. In ordinary straight ahead running operation the guide wheels, while having their treads free of the rail heads, nevertheless will be rotated more or less constantly by reason of the fact that the flanges will from time to time touch against the sides of the rail heads and will cause these wheels to spin and keep spinning. When rounding curves the flanges cannot climb on the rail heads due to the fact that such upward lifting of the flanged wheels would immediately be opposed by the weight of the vehicle reacting through the rigid linkage connecting the guide wheels to the vehicle frame.

Wherever in the specification or claims reference is made to the pivotal mounting of the guide wheel assemblies upon the front or rear "axles," either axles or axle housings are meant.

While the preferred embodiment of the invention has been illustrated herein and described in considerable detail, it should be understood that the invention and the principles thereof are susceptible of being employed in modifications differing somewhat from the present disclosure, and that such modifications and variations are contemplated and intended to be covered within the scope of the invention defined in the appended claims.

Having shown and described my invention, I claim:

1. A rail and highway vehicle having a rigid longitudinal body frame, front and rear transverse axles carrying flangeless wheels, springs supporting said frame upon said axles, front and rear retractable axles carrying flanged guide wheels, means for pivotally connecting said front and rear retractable axles respectively with the front and rear vehicle axles and with said body frame, retracting means for lowering said retractable axles to position the guide wheels in guiding position at a predetermined level relatively to the vehicle axles and for raising them therefrom, and means controlled by longitudinal tilting movement of the frame relatively to the vehicle axles for maintaining the front guide wheels at said predetermined level during said relative movements of the frame.

2. For combination with a highway vehicle having a rigid longitudinal body frame, front and rear transverse axles carrying flangeless wheels, and springs supporting said frame upon said axles, the improvement comprising front and rear retractable axles carrying flanged guide wheels, means for pivotally connecting said front and rear retractable axles respectively with the front and rear vehicle axles and with said body frame, retracting means for lowering said retractable axles to position the guide wheels in guiding position at a predetermined level relatively to the vehicle axles and for raising them therefrom, and means controlled by longitudinal tilting movement of the frame relatively to the vehicle axles for maintaining the front guide wheels at said predetermined level during said relative movements of the frame.

3. For combination with a highway vehicle having a rigid longitudinal body frame, front and rear transverse axles carrying flangeless wheels, and springs supporting said frame upon said axles, the improvement comprising front and rear retractable axles carrying flanged guide wheels, means for pivotally connecting said front and rear retractable axles respectively with the front and rear vehicle axles and with said body frame, retracting means connected with said frame for lowering said retractable axles to position the guide wheels in guiding position at a predetermined level relatively to the vehicle axles and for raising them therefrom, and means controlled by the movement of the frame relatively to the vehicle axles for maintaining the front guide wheels at said predetermined level during said relative movements of the frame.

4. For combination with a highway vehicle having a rigid longitudinal body frame, front and rear transverse axles carrying flangeless wheels, and springs supporting said frame upon said axles, the improvement comprising front and rear retractable axles carrying flanged guide wheels, means for pivotally connecting said front and rear retractable axles respectively with the front and rear vehicle axles and with said body frame, retracting means connected with said frame and said retractable axles for lowering said retractable axles to position the guide wheels in guiding position at a predetermined level relatively to the vehicle axles and for raising them therefrom, and means controlled by the movement of the frame relatively to the vehicle axles for maintaining the front guide wheels at said predetermined level during said relative movements of the frame.

5. A rail and highway vehicle having a rigid longitudinal body frame, front and rear transverse axles carrying flangeless wheels, springs supporting said frame upon said axles, front and rear retractable axles carrying flanged guide wheels, means for pivotally connecting said front and rear retractable axles respectively with the front and rear vehicle axles and with said body frame, retracting means for lowering said retractable axles to position the guide wheels in guiding position at a predetermined level relatively to the vehicle axles and for raising them therefrom, and means controlled by the movement of the rear end of the frame relatively to the rear vehicle axle for maintaining the front guide wheels at said predetermined level.

6. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels at a predetermined track clearance position when lowered to guiding position irrespective of the compression of the rear vehicle springs, retracting means for the front retractable axle connected therewith and with said frame adapted for holding the front guide wheels at a predetermined track clearance position when lowered to guiding position and means operatively connected with the rear retractable axle and with the front axle retracting means for regulating the said holding operation of said front axle retracting means.

7. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels rigidly at a predetermined track clearance position when lowered to guiding position irrespective of the compression of the rear vehicle springs, retracting means for the front retractable axle connected therewith and with said frame adapted for holding the front guide wheels rigidly at a predetermined track clearance position when lowered to guiding position, and means operatively connected with the rear retractable axle and with the front axle retracting means for regulating the said holding operation of said front axle retracting means.

8. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels rigidly at a predetermined track clearance position when lowered to guiding position irrespective of the compression of the rear vehicle springs, retracting means for the front retractable axle connected therewith and with said frame adapted for holding the front guide wheels rigidly at a predetermined track clearance position when lowered to guiding position, and means operated by movement of the rear portion of said frame relatively to the rear vehicle axle and connected with the front axle retracting means for regulating the said holding operation of said front axle retracting means.

9. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels rigidly at a predetermined track clearance position when lowered to guiding position, retracting means for the front retractable axle connected therewith and with said frame adapted for holding the front guide wheels rigidly at a predetermined track clearance position when lowered to guiding position, and means operated by movement of the rear portion of said frame relatively to the rear vehicle axle and connected with the front axle retracting means for regulating the said holding operation of said front axle retracting means.

10. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels rigidly at a predetermined track clearance position when lowered to guiding position irrespective of the compression of the rear vehicle springs, retracting means for the front retractable axle pivotally connected therewith and with said frame for lowering the front guide wheels to a predetermined track clearance position, means locking said retracting means when the front guide wheels are so lowered, and means operated by movement of the rear portion of the vehicle frame relatively to the rear retractable axle for rocking said front retracting means to maintain a substantially unvarying clearance between the front guide wheels and a rail head over which it may be suspended.

11. A rail and highway vehicle having a rigid longitudinal body frame, front and rear transverse axles carrying flangeless wheels, springs supporting said frame upon said axles, front and rear retractable axles carrying flanged guide wheels and rotatably connected with said vehicle axles, retracting means for the rear retractable axle so connected therewith and with said frame as to be adapted to maintain the rear guide wheels rigidly at a predetermined track clearance position when lowered to guiding position irrespective of the compression of the rear vehicle springs, retracting means for the front retractable axle pivotally connected therewith and with said frame for lowering the front guide wheels to a predetermined track clearance position, means locking said retracting means when the front guide wheels are so lowered, and means operated by longitudinal tilting movement of the frame for moving said front retracting means to maintain a substantially unvarying clearance between the front guide wheels and a rail head over which it may be suspended.

12. In a combination rail and highway vehicle having a body and connected thereto front and rear axles and flangeless highway wheels connected therewith, and having additionally retractably mounted front and rear axles with flanged guide wheels revolubly mounted thereon, the improvement comprising lever means operated by longitudinal tilting of the body relatively to one of said retractable axles for controlling the position of the other retractable axle for maintaining the guide wheels associated with the latter retractable axle at a substantially unvarying rail clearance position.

13. In a combination rail and highway vehicle having flangeless road wheels, lateral reaction guide means pivotally connected to the vehicle near the front end thereof at two planes movable relatively to each other, lateral reaction guide means pivotally connected to the vehicle near the rear end thereof at two planes movable relatively to each other, and lever means operated by longitudinal tilting of the vehicle for controlling the position of one of said guide means for maintaining the same at a substantially unvarying rail clearance position.

14. In combination with a vehicle having a rigid frame and spring suspension means rotatably mounting pairs of flangeless vehicle wheels at the front and rear of the frame adapting the vehicle for travel on a highway and on the rails of a railway track, of suspension means mounting pairs of lateral reaction guide members at the front and rear of the vehicle frame for guiding the vehicle when traveling on the rails, means for actuating said guide member suspension means responsive to substantially vertical rectilinear movement of the vehicle frame as a whole to and from the axis of rotation of the vehicle wheels for maintaining said guide members substantially in a predetermined constant position relative to the axis of rotation of the vehicle wheels when the guide member suspension means are positioned to adapt the vehicle for rail travel, and means responsive to non-rectilinear front and rear vertical frame movement, which results in tilting the vehicle frame so that it is higher at one end than the other, for actuating the guide member suspension means at the high end to compensate for such excess elevation of the frame thereby maintaining the said predetermined constant position of the guide members relative to the axis of rotation of the vehicle wheels.

15. In combination with a vehicle having a rigid frame and spring suspension means rotatably mounting pairs of flangeless vehicle wheels at the front and rear of the frame adapting the vehicle for travel on a highway and on the rails of a railway track, of suspension means mounting pairs of lateral reaction rotary guide members at the front and rear of the vehicle frame for guiding the vehicle when traveling on the rails, means for actuating said rotary guide member suspension means responsive to substantially vertical rectilinear movement of the vehicle frame as a whole to and from the axis of rotation of the vehicle wheels for maintaining said rotary guide members substantially in a predetermined constant position relative to the axis of rotation of the vehicle wheels when the rotary guide member suspension means are positioned to adapt the vehicle for rail travel, and means responsive to non-rectilinear front and rear vertical frame movement, which results in tilting the vehicle frame so that it is higher at one end than the other, for actuating the rotary guide member suspension means at the high end to compensate for such excess elevation of the frame thereby maintaining the said predetermined constant position of the rotary guide members relative to the axis of rotation of the vehicle wheels.

16. In combination with a vehicle having a rigid frame and spring suspension means rotatably mounting pairs of flangeless vehicle wheels at the front and rear of the frame adapting the vehicle for travel on a highway and on the rails of a railway track, of suspension means mounting pairs of flanged guide wheels at the front and rear of the vehicle frame for guiding the vehicle when traveling on the rails, means for actuating said flanged guide wheel suspension means responsive to substantially vertical rectilinear movement of the vehicle frame as a whole to and from the axis of rotation of the vehicle wheels for maintaining said flanged guide wheels substantially in a predetermined constant position relative to the axis of rotation of the vehicle wheels when the flanged guide wheel suspension means are positioned to adapt the vehicle for rail travel, and means responsive to non-rectilinear front and rear vertical frame movement, which results in tilting the vehicle frame so that it is higher at one end than the other, for actuating the flanged guide wheel suspension means at the high end to compensate for such excess elevation of the frame thereby maintaining the said predetermined constant position of the flanged guide wheels relative to the axis of rotation of the vehicle wheels.

17. For combination with a highway vehicle having a rigid longitudinal body frame, front and rear transverse axles carrying flangeless wheels, and springs supporting said frame upon said axles, the improvement comprising front and rear retractable axles carrying flanged guide wheels, means for pivotally connecting said front and rear retractable axles respectively with the front and rear vehicle axles and with said body frame, retracting means for lowering said retractable axles to position the guide wheels in guiding position at a predetermined level relatively to the vehicle axles and for raising them therefrom, and means controlled by longitudinal tilting movement and vertical rectilinear movement of the frame relatively to the vehicle axles for maintaining the front guide wheels at said predetermined level during said relative movements of the frame.

NEIL J. McDONALD.

References Cited in the file of this patent
UNITED STATES PATENTS

| Number | Name | Date |
|---|---|---|
| 1,262,966 | Mahon | Apr. 16, 1918 |
| 1,763,373 | Schnell | June 10, 1930 |
| 2,027,684 | Fageol | Jan. 14, 1936 |
| 2,140,421 | Fageol | Dec. 13, 1938 |
| 2,478,647 | Watts et al. | Aug. 9, 1949 |